United States Patent [19]

Morin

[11] Patent Number: 6,065,409
[45] Date of Patent: May 23, 2000

[54] METHOD OF HOT SCRUBBING FLUE GASES, IN PARTICULAR FOR AN INCINERATION PLANT FOR HOUSEHOLD REFUSE

[75] Inventor: Jean-Xavier Morin, Neuville aux Bois, France

[73] Assignee: GEC Alsthom Stein Industrie, Velizy-Villacoublay, France

[21] Appl. No.: 08/776,922
[22] PCT Filed: Jun. 24, 1996
[86] PCT No.: PCT/FR96/00984
§ 371 Date: Jun. 26, 1997
§ 102(e) Date: Jun. 26, 1997
[87] PCT Pub. No.: WO97/02453
PCT Pub. Date: Jan. 23, 1997

[30] Foreign Application Priority Data

Jun. 30, 1995 [FR] France .................................. 95 07923

[51] Int. Cl.[7] .................................. F23J 11/00; F23J 3/00
[52] U.S. Cl. .......................... 110/345; 110/165 A; 431/2; 423/215.5; 423/239.1; 423/267
[58] Field of Search ................................ 110/165 A, 342, 110/343, 344, 345; 431/2, 3, 4; 422/171, 172; 423/215.5, 239.1, 267; 266/144, 145, 146, 147, 148, 155, 156, 157

[56] References Cited

U.S. PATENT DOCUMENTS

| | | | |
|---|---|---|---|
| 3,002,855 | 10/1961 | Phillips et al. | 110/343 X |
| 4,245,573 | 1/1981 | Dixit et al. | 110/344 X |
| 4,372,227 | 2/1983 | Mahoney et al. | 110/342 |
| 4,498,402 | 2/1985 | Kober et al. | 110/345 |
| 4,616,574 | 10/1986 | Abrams et al. | 110/343 |
| 4,629,603 | 12/1986 | Salihar et al. | 110/343 X |
| 4,681,045 | 7/1987 | Dvirka et al. | 110/343 X |
| 4,796,548 | 1/1989 | Merrell et al. | 110/343 |
| 4,804,388 | 2/1989 | Kukin | 431/3 X |
| 4,953,481 | 9/1990 | Clayton | 110/342 |
| 5,214,020 | 5/1993 | Shimoda | 423/215.5 X |
| 5,320,051 | 6/1994 | Nehls, Jr. | 110/345 |
| 5,785,936 | 7/1998 | Levendis | 423/215.5 X |

FOREIGN PATENT DOCUMENTS

| | | | |
|---|---|---|---|
| 714846 | 8/1965 | Canada | 110/343 |
| 0402972A1 | 12/1990 | European Pat. Off. . | |
| 0611590A1 | 8/1994 | European Pat. Off. . | |
| 60-64118 | 4/1985 | Japan | 110/343 |
| 5-161822 | 6/1993 | Japan | 423/215.5 |
| 5-309353 | 11/1993 | Japan | 110/345 |
| 496692 | 12/1938 | United Kingdom | 110/343 |
| WO8701050 | 2/1987 | WIPO . | |

OTHER PUBLICATIONS

Steven A. Benson et al., "Status of coal ash behavior research", Fuel Processing Technology 44 (1995), pp. 1–12, Feb. 1995.

M. A. Alvin, "Impact of char and ash fines on porous ceramic filter life", Fuel Processing Technology 56 (1998), pp. 143–168, Mar. 1997.

"Experimental investigations with ceramic high–temperature filter media", Filtration & Separation, Jan. 1996.

Database WPI, Section CH, Week 9516, Derwent Publication, Ltd., London, GB, Class J01, AN 95–117954 XP002015304 corresponding to JPA 07 039713 (Hitachi Zosen Corp.), dated Feb. 10, 1995.

*Primary Examiner*—James C. Yeung
*Assistant Examiner*—Ljiljana V. Ciric
*Attorney, Agent, or Firm*—Sughrue, Mion, Zinn, Macpeak & Seas, PLLC

[57] ABSTRACT

The method consists in causing the flue gases to pass through a filter placed inside the recovery boiler so that the fly ash contained in said flue gases can be hot filtered out. An additional flow (B) of a material is superposed on the flow of fly ash to be filtered, which material has characteristics such that it increases the melting point of the fly ash by forming high melting point eutectics so as to facilitate unclogging by preventing viscous bridges from forming between the particles of fly ash. Application to hot scrubbing of flue gases generated by burning household refuse.

12 Claims, 1 Drawing Sheet

METHOD OF HOT SCRUBBING FLUE GASES, IN PARTICULAR FOR AN INCINERATION PLANT FOR HOUSEHOLD REFUSE

FIELD OF THE INVENTION

The invention relates to scrubbing flue gases. It is particularly applicable to scrubbing flue gases generated by burning household refuse.

DESCRIPTION OF RELATED ART

Currently, flue gases from household refuse are scrubbed at low temperatures (less than 250° C.) downstream from the recovery boiler of an incineration plant for household refuse. The flue gases are scrubbed by an electrostatic effect, or by means of a filter having socks made of fabric.

Furthermore, flue gases from household refuse are generally treated downstream from the recovery boiler by catalysis or by injecting active coal so as to reduce their furan dioxin content (furan dioxins are organic compounds based on cyclic and chlorinated molecules). Typical furan dioxin emissions in flue gases from household refuse are about 10 ng/Nm³ at the outlet of the recovery boiler. Furan dioxins are formed most commonly at medium temperatures (240° C. to 450° C.) in the recovery boiler from HCl, from unburnt particles contained in the fly ash of the flue gases, and because of the catalytic effect of certain metals of the copper oxide type.

Hot scrubbing of flue gases has already been considered for coal-fired pressurized-combustion heating systems. Using that technique, the flue gases are scrubbed at a high temperature on the path along which they flow by causing them to pass through a "high-temperature" filter, e.g. of the type including ceramic tubes.

By using a high-temperature filter, it is possible to lighten the structure of the system for treating the flue gases downstream from the recovery boiler, in particular since by hot scrubbing the flue gases it is also possible to reduce the furan dioxin content of said flue gases at the outlet of the recovery boiler if the fly ash is filtered out at a temperature that is high enough, i.e. in the range 450° C. to 650° C. Unfortunately attempts to use such a scrubbing method in waste applications have come up against the problem of removing the filter cake so as to unclog the filter. The fine particles of fly ash have a melting point that is relatively low, which means that they form viscous bridges between them and clog the pores in the ceramic tubes of the filter. The filter cake that forms on the surfaces of the ceramic tubes then becomes extremely difficult to remove and requires frequent stoppages in order to clean or even replace the tubes. This unclogging problem is even more acute when such a method is applied to flue gases from household refuse because the fly ash in such flue gases contains in particular sodium oxide ($Na_2O$) which contributes to lowering still further the melting point of the fine particles of fly ash, and therefore to increasing clogging of the high-temperature filter. It is therefore very difficult to reconcile hot scrubbing of flue gases from household refuse with achieving a significant reduction in their furan dioxin content thereby.

SUMMARY OF THE INVENTION

An object of the invention is to provide a method of scrubbing flue gases by causing them to flow through a high-temperature filter placed inside a recovery boiler, which method makes it possible to remove the filter cake.

Another object of the invention is to provide a method of hot scrubbing flue gases from household refuse, which method is capable of reducing the furan dioxin content of the flue gases to a very low value, e.g. to 0.1 ng/Nm³, so as to satisfy the conditions that will soon be required by regulations or that are already required in certain countries.

To these ends, the invention provides a method of scrubbing flue gases by causing the flue gases to pass through a high-temperature filter element placed on the path along which the flue gases flow inside a recovery boiler, so that the fly ash contained in the flue gases can be filtered out, said method being characterized in that an additional flow of a material is superposed on the flow of fly ash to be filtered, the material having characteristics such that it increases the melting point of the fly ash by forming high melting point eutectics therewith and such that it modifies the grain-size spectrum of the filter cake.

By forming high melting point eutectics, it is possible to use the filter at temperatures corresponding to those necessary to prevent furan dioxins from forming, without encountering problems due to the presence of viscous bridges, so that the resulting filter cake is not very compact, and is therefore easy to remove.

In particular, the filter cake can be removed by injecting air or gases under high pressure into the ceramic tubes of the filter element.

BRIEF DESCRIPTION OF THE FIGURE

An implementation of the invention is described below and is shown in the sole FIGURE which is a block diagram of an incineration plant for household refuse, which plant includes a high-temperature filter for hot scrubbing flue gases.

The method of the invention for hot scrubbing flue gases is preferably applied to an incineration plant for household refuse, which plant has a hearth provided either with a grate or with a fluidized bed.

Figure 1:
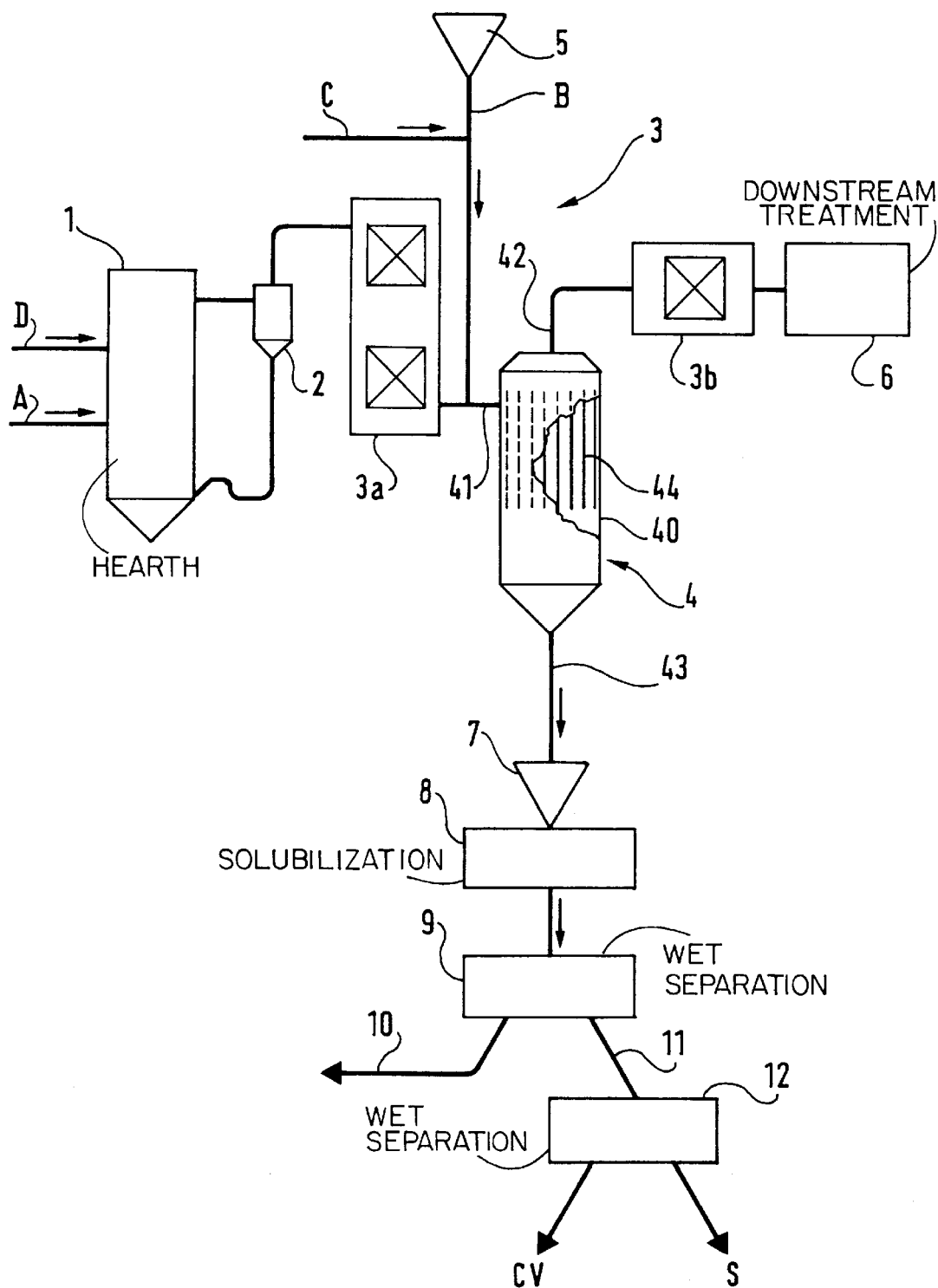
As shown in FIG. 1, the incineration plant for household refuse includes a hearth 1 for burning household refuse fed in at A. In this example the hearth is a fluidized bed hearth.

The flue gases output by the hearth 1 are sent to a solid-particle separator 2 of the cyclone type, and the separated-out solid particles are fed back into the bottom of the hearth 1.

The flue gases output by the separator 2 at a temperature generally in the range 850° C. to 900° C. are fed into a recovery boiler 3 in which they flow along heat exchange surfaces that lower their temperature.

The recovery boiler 3 is in two portions 3a and 3b in this example, the flue gases passing through both portions. A "high-temperature filter" element 4 is interposed between the two portions 3a and 3b of the recovery boiler, on the path of the flue gases. The filter element 4 serves to perform hot scrubbing on the flue gases.

In an incineration plant for household refuse, hot scrubbing offers numerous advantages with respect both to protecting the environment, and to enhancing the value of waste from combustion of household refuse.

In particular, it enables the furan dioxin content of the flue gases at the output of the recovery boiler to be reduced very significantly if the precursors of the dioxins are trapped together with the fly ash by the filtering element 4, at a temperature that is high enough, e.g. higher than 400° C., to prevent furan dioxins from forming. It should be noted that, with a filter element, it is thus possible to obtain both scrubbing of the flue gases, and a reduction in the furan dioxin content of said flue gases, thereby contributing to lightening the structure of the flue-gas treatment system downstream from the recovery boiler.

The fly ash recovered by the filter is not contaminated by furan dioxins, and has a low heavy-metal content. Said fly ash can thus be likened to the clinker extracted from the bottom of the hearth. The residual fraction of fly ash that passes through the filter is collected during flue gas treatment as are heavy metals after they have condensed, which makes it possible to extract value from such metals (Cd, Hg, Pb, etc.) in the metallurgical balance sheet.

In accordance with the invention, an additional flow of large solid particles B coming from a silo 5 is injected at B, at the inlet of the filter element 4, into the fly ash of the flue gases. These particles have characteristics that are controlled so as to increase the melting point of the fine particles of fly ash by forming eutectics therewith, the melting point of which eutectics is about 650° C. or higher and to modify the grain-size spectrum of the filter cake.

The solid particles have, in particular, a mean grain-size greater than 40 microns, and much greater than that of the fine particles of fly ash (less than 40 microns on average), a porosity optionally extended by pre-treatment, and a composition having $SiO_2$, $Al_2O_3$, CaO, and MgO contents that are controlled to form high-temperature eutectics with $Na_2O$.

For example, the filter element 4 may be a filter having ceramic tubes. The filter is constituted by an enclosure 40 made of a metal that withstands high temperatures. The flue gases to be scrubbed enter the enclosure via the inlet 41. The scrubbed flue gases are output from the enclosure at 42, and the filter cake is recovered via the outlet 43. A plurality of ceramic tubes 44 are shown in the figure inside the enclosure 40.

The scrubbed flue gases output by the filter element 4 then pass through the second portion 3b of the recovery boiler. The flue gases output by portion 3b are subjected to various treatment operations at 6, e.g. dechlorination, desulfurization, vapor phase collection of heavy metals, collection of hydrofluoric acid, treatment of nitrogen oxides ($NO_x$).

The filter cake is recovered in a silo 7, and is then be treated successively at 8, where solubilization is performed, and at 9, where wet separation is performed, e.g. by using a hydrocyclone, to enable the solid particles of large grain-size constituting the unclogging additive fed in at B to be separated from the fly ash.

The solid particles (indicated by 10) of the unclogging additive that are separated out during treatment 9, are fed back in at C into the inlet of the filter element 4, optionally after being dried. In a variant, they are fed back in at D into the hearth 1 and they also serve to top up the charge thereof. In the latter variant, it is necessary to adjust the separator 2 so that it allows the solid particles constituting the unclogging additive for unclogging the filter element 4 to pass.

The fly ash (indicated by 11) separated out in treatment 9 is enhanced by wet separation treatment 12 for separating the fine fly ash CV from the salts S.

When the solid particles of the unclogging additive are recycled by being fed back in at C into the inlet of the filter element 4, it is advantageous to replace the hydrocyclone with a pneumatic separator in treatment 9 if, in addition, the additive fed in at B is of a catalytic type (vanadium oxide, iron oxide, or the like) in order to reduce the $NO_x$ content.

Naturally, the method of the invention is applicable to a power-generating plant, in particular a pressurized-combustion plant that is fired by coal or the like.

What is claimed is:

1. A method of scrubbing flue gases, comprising the steps of:

causing the flue gases to pass through a high-temperature filter element (4) placed on a path along which the flue gases flow inside a recovery boiler (3), so that fly ash contained in the flue gases can be hot filtered out, and superposing an additional flow (B) of an unclogging material on the flow of flue gases containing the fly ash to be filtered, said unclogging material having characteristics such that said unclogging material increases a melting point of the fly ash by forming high melting point eutectics therewith.

2. The method according to claim 1, in which the additional flow (B) of an unclogging material has characteristics such that the additional flow of unclogging material modifies a grain-size spectrum of a filter cake formed with said unclogging material.

3. The method according to claim 1, in which the unclogging material is in a form of solid particles having a mean grain-size lying in the range of 10 microns to 40 microns.

4. The method according to claim 2, in which the unclogging material is in a form of solid particles having a mean grain-size greater than 40 microns.

5. The method according to claim 1, in which the unclogging material is a composition containing $Al_2O_3$.

6. The method according to claim 1, in which the unclogging material contains a catalyst in order to obtain a reduction in the $NO_x$ content in the flue gases.

7. The method according to claim 1, in which the fly ash is filtered out at a temperature higher than 400° C.

8. The method according to any preceding claim, further comprising the step of recycling the superposed unclogging material from a filter cake constituted from fly ash contained in the flue gases and from the superposed unclogging material (8, 9).

9. The method according to claim 8, in which the recycling step further includes a cake solubilization step (8) followed by a wet separation step (9) for separating the fly ash from the unclogging material.

10. The method according to claim 8, further including the step of injecting the recycled unclogging material into a combustion hearth (1) placed upstream from the recovery boiler (3).

11. The method according to claim 1 as applied to an incineration plant for household refuse, wherein the incineration plant for household refuse includes a recovery boiler in two portions (3a, 3b), between which the filter element (4) is placed.

12. The method according to claim 1, as applied to a pressurized combustion power-generating plant.

* * * * *